United States Patent
Ogawa et al.

(10) Patent No.: US 11,945,662 B2
(45) Date of Patent: Apr. 2, 2024

(54) RAISING/LOWERING CONVEYANCE DEVICE FOR CONTAINER FOR CONVEYING ARTICLE

(71) Applicant: Daifuku Co., Ltd., Osaka (JP)

(72) Inventors: Kazuki Ogawa, Shiga (JP); Shigenori Erami, Shiga (JP)

(73) Assignee: Daifuku Co., Ltd. (JP)

( * ) Notice: Subject to any disclaimer, the term of this patent is extended or adjusted under 35 U.S.C. 154(b) by 783 days.

(21) Appl. No.: 17/095,447

(22) Filed: Nov. 11, 2020

(65) Prior Publication Data

US 2021/0061586 A1   Mar. 4, 2021

Related U.S. Application Data

(63) Continuation of application No. PCT/JP2019/016996, filed on Apr. 22, 2019.

(30) Foreign Application Priority Data

Jul. 5, 2018   (JP) .................................. 2018-128392

(51) Int. Cl.
   B65G 47/90   (2006.01)
   B65G 1/04   (2006.01)
   (Continued)

(52) U.S. Cl.
   CPC ............. B65G 47/901 (2013.01); B65G 1/04 (2013.01); B65G 59/106 (2013.01); B65G 60/00 (2013.01);
   (Continued)

(58) Field of Classification Search
   CPC ............... B65G 47/901; B65G 59/106; B65G 2201/0235; B65G 2201/0258; B66F 9/186;
   (Continued)

(56) References Cited

U.S. PATENT DOCUMENTS 2,658,415 A * 11/1953 Barowsky ............. B25B 1/2421
                                                    269/151
4,047,709 A *  9/1977 Thyberg ................ B25B 1/2421
                                                     269/22
(Continued)

FOREIGN PATENT DOCUMENTS

JP        2017043417 A      3/2017

*Primary Examiner* — Dean J Kramer
(74) *Attorney, Agent, or Firm* — Farber LLC (57) ABSTRACT

A raising/lowering conveyance device for a container for conveying an article has container supports that can move toward or away from a container in the horizontal direction and up and down with respect to the container. The container supports have a plurality of container support pins that can advance/retreat in the horizontal direction from the container and that are forcibly held at a position protruding from a front surface of the container support. The container supports are configured to lift the container by the container support pins which protrude under a downward step surface formed on the outside of the container. A pin main body of the container support pins protrudes from the front surface and has a flat tip perpendicular to the center axis of the pin main body, and has a tapered shape that increases in diameter toward the flat tip and is thicker toward the end.

4 Claims, 10 Drawing Sheets

(51) Int. Cl.
  *B65G 59/10* (2006.01)
  *B65G 60/00* (2006.01)
  *B66F 9/18* (2006.01)

(52) U.S. Cl.
  CPC ...... *B66F 9/186* (2013.01); *B65G 2201/0235* (2013.01)

(58) Field of Classification Search
  CPC ........... B66C 1/30; B66C 1/32; B25B 1/2421; B23Q 1/035; Y10S 294/902
  USPC ................................ 294/86.4, 902; 269/266
  See application file for complete search history.

(56) References Cited

U.S. PATENT DOCUMENTS

| | | | | |
|---|---|---|---|---|
| 4,572,564 | A * | 2/1986 | Cipolla | B25J 15/106 294/902 |
| 5,403,057 | A * | 4/1995 | Sugito | B25B 1/2421 294/902 |
| 7,328,924 | B2 * | 2/2008 | Moilanen | B25B 5/163 294/902 |
| 7,513,546 | B2 * | 4/2009 | Vranish | B25J 15/0246 294/902 |
| 8,534,728 | B1 * | 9/2013 | Bosscher | B25J 15/106 294/902 |
| 9,938,090 | B2 * | 4/2018 | Kyotani | B66C 1/10 |

* cited by examiner

RAISING/LOWERING CONVEYANCE DEVICE FOR CONTAINER FOR CONVEYING ARTICLE

TECHNICAL FIELD

The present invention relates to a raising/lowering conveyance device for a container for conveying an article including at least two sets of container support means supporting an article conveying container from both sides and raising and lowering the container.

BACKGROUND OF THE INVENTION

A raising/lowering conveyance device for a container for conveying an article suitable when this kind of article conveying container is a small plastic container which has an upper side opened and can be lifted and carried with both hands includes, as described in Japanese Published Unexamined Patent Application No. 2017-43417 (Patent Literature 1), at least two sets of container support means horizontally movable closer to and away from the article conveying container and movable up and down with respect to the container. The container support means are such that a large number of container support pins being capable of horizontally protruding and retracting on a side where the container is located and being biased and held at protruding positions are arranged. The container support means are configured such that the container support pins which entered below an overhanging rib protruding horizontally outward from an outer surface of the container by approaching movement with respect to the container supports the container. Various containers in which the position and/or the thickness of the overhanging rib protruding horizontally outward from the outer surface of the container, or the position and/or the height of the space between overhanging ribs when the overhanging rib is provided in two upper and lower stages are not constant may sometimes be used as the article conveying container handled by such a raising/lowering conveyance device. In order that a container supporting action as expected can be exhibited even in such a case, the large number of container support pins arranged at appropriate horizontal and vertical intervals in a pinholder shape are formed as tapered pins as described in Japanese Published Unexamined Patent Application No. 2017-43417 (Patent Literature 1).

SUMMARY OF THE INVENTION

It has been considered that the foregoing container support pins formed of the tapered pins would be capable of being made to reliably enter below the overhanging rib as long as the overhanging rib exists, even if the structure on the side of the container is slightly different as described above. However, in actuality, due to the fact that the container support pins are the tapered pins, when one overhanging rib or two upper and lower overhanging ribs are sandwiched from above and below by two upper and lower container support pins in side view or when tip portions of the two upper and lower container support pins enter inside two upper and lower overhanging ribs in side view, the outer diameters of places adjacent to the overhanging rib(s) of the pins greatly change in association with advancing movement of the container support pins in a direction of overlapping the overhanging rib(s) from a state where the small diameter tip portions of the container support pins adjoin side surfaces of the overhanging rib(s). Thus, circumferential surfaces of the container support pins start to pressure-contact with the side surfaces of the overhanging rib(s), and the pressure contact force is gradually increased in association with the advancement of the container support pins, and finally the advancing movement of the container support pins with respect to the article conveying container becomes impossible due to frictional resistance with the overhanging rib(s). Subsequently, springs biasing the container support pins in a protruding direction are compressed, and the frictional force between the container support pins and the overhanging rib(s) is further increased. As a result, when the container support means are horizontally moved in a direction away from the container after the container is conveyed to a predetermined place, it becomes difficult to horizontally pull out, from the overhanging rib(s), the container support pins in pressure contact with the overhanging rib(s) on the container side with the large frictional force as described above, so that, in some cases, the container may be dragged and the position and/or the orientation of the container may change.

The present invention proposes a raising/lowering conveyance device for a container for conveying an article capable of solving the foregoing conventional problem. Described by giving reference signs in parentheses used in the description of an embodiment described below in order to facilitate understanding the relationship with the embodiment, the raising/lowering conveyance device for a container for conveying an article according to the present invention is a raising/lowering conveyance device for a container for conveying an article including at least two sets of container support means (11, 12) horizontally movable closer to and away from an article conveying container (1) and movable up and down with respect to the container (1), the container support means (11, 12) having a pinholder shaped structure that a large number of container support pins (17a, 17b) being capable of horizontally protruding and retracting on a side where the container (1) is located and being biased and held at positions protruding from front surface members (22) of the container support means (11, 12) are arranged, the container support means (11, 12) configured such that the container support pins (17a, 17b) which entered below a downward step surface (a lower end surface of a vertical wall portion of an overhanging rib 1a) formed outside the container (1) by approaching movement with respect to the container (1) support the container (1) so as to be liftable, in which pin main bodies (18) protruding from the front surface members (22) of the container support means (11, 12) of the container support pins (17a, 17b) each include a flat tip surface (18a) perpendicular to an axial center and are formed in a reverse-tapered pin shape whose diameter is increased toward the flat tip surface (18a).

According to the foregoing configuration of the present invention, that the largest-diameter flat tip surface of the pin main body of the container support pin does not overlap the overhanging rib when viewed from the axial center direction of the pin main body is a condition for the container support pin being able to advance toward the container side at a position adjacent to the overhanging rib of the article conveying container in association with the movement of the container support means. If they overlap, the largest-diameter flat tip surface of the pin main body of the container support pin abuts against the front surface of the overhanging rib when the container support pin moves closer to the article conveying container side in association with the movement of the container support means, and no further advancing movement of the container support pin is performed. If a horizontal corner of the front surface of the overhanging rib is chamfered or a peripheral edge corner of the largest-diameter flat tip surface of the pin main body is chamfered, then, even when the largest-diameter tip of the pin main body rides on a horizontal side surface of the overhanging rib along the chamfered corner of the overhanging rib, the pin main body and the overhanging rib do not slidingly contact with each other across the entire length of the overlapping area of the both when the container support means reach the movement limit to the article conveying container side as in the case where the pin main body is a circular columnar body in its entirety having the same outer diameter as the largest-diameter flat tip surface. Only the largest-diameter tip of the pin main body slidingly contacts with the horizontal side surface of the overhanging rib.

For the above reasons, in the foregoing configuration of the present invention, such a situation is eliminated that the container support pin and the overhanging rib on the article conveying container side come in pressure contact with each other at side surfaces with enormous frictional force due to the vertical positional relationship between the both as in the case where the container support pin of the conventional tapered pin shape is used. Even if the situation in which the both come in sliding contact with each other arises, a sliding contact place with the overhanging rib on the container support pin side is only one place around the largest-diameter tip of the pin main body and the frictional force between the both at such time is very small. Accordingly, when the container support means reach the advance limit to the article conveying container side, only the container support pin with the flat tip surface pressure-contacting with the front surface of the overhanging rib by the biasing force exists, and other container support pins reach the advance limit positions without substantially pressure-contacting with the horizontal side surface of the overhanging rib. Thus, the ascending of the container support means enables the article conveying container to be supported and lifted by the container support means via the container support pins directly below an overhanging rib and the overhanging rib. When this article conveying container is lowered and unloaded at a desired place and then the container support means are retracted from the article conveying container and the container support pins are laterally released from the area overlapping the overhanging rib, there is no container support pin pressure-contacting with the horizontal side surface of the overhanging rib on the article conveying container side with enormous frictional force as in the conventional case. Thus, the container support means can be retracted to a predetermined position without receiving specific resistance. Also, the possibility that the article conveying container may be dragged and the position and/or the orientation of the container may change as in the conventional case is eliminated.

When the present invention is carried out, specifically, the pin main bodies (18) of the container support pins (17a, 17b) can be arranged such that tips of the pin main bodies (18) vertically adjacent in side view partially overlap each other. When trying to arrange the tips of the pin main bodies vertically adjacent in side view so as to partially overlap each other as described above in the structure of using the container support pins of the conventional tapered pin shape, the distance between the container support pins vertically adjacent in the same column needs to be abnormally reduced. However, in the present invention, the distance structurally required between bases of the container support pins vertically adjacent in the same column can be provided reasonably due to the pin main bodies of the reverse-tapered pin shape narrowed toward the base. Two columns of the container support pins (17a, 17b) are arranged so that exactly at the middle position between two container support pins (17a, 17b) vertically adjacent in one column in side view, a container support pin (17a, 17b) in the other column is located, and the tips of the pin main bodies (18) vertically adjacent in side view (pin main bodies (18) of the container support pins (17a, 17b) in the different columns) are configured to partially overlap each other as described above. Even if the overhanging rib is a thin rib, such a phenomenon can also be eliminated that the overhanging rib forcibly enters between the pin main bodies vertically adjacent in side view.

Furthermore, the container support pins (17a, 17b) each can be composed of the pin main body (18), a flange portion (19) continuously provided to a rear end of the pin main body (18) so as to be concentric, and a shaft portion (20, 21) continuously provided rearward from the flange portion (19) so as to be concentric. For the container support means (11, 12), the front surface members (22) can be provided with front through holes (23a) through which the pin main bodies (18) pass, and rear surface members (24) can be provided with rear through holes (23b) through which the shaft portions (21) pass, and compression coil springs (25) for biasing the container support pins (17a, 17b) in a protruding direction to pressure-contact the flange portions (19) with back surfaces of the front surface members (22) can be fitted to the shaft portions (20, 21) between the flange portions (19) and the rear surface members (24). The front through holes (23a) through which the pin main bodies (18) pass can have a diameter allowing a largest-diameter tip portion of the pin main body (18) of the reverse-tapered pin shape to penetrate. The container support pins (17a, 17b) can be configured to be swingable within a range of annular spaces between the front through holes (23a) and the pin main bodies (18). Without adopting such a structure, a bearing for supporting, for example, the flange portion or a large diameter shaft portion continuously provided rearward from the flange portion concentrically so as to be slidable only in an axial center direction is adopted, and the swinging of the pin main body of the reverse-tapered pin shape can be configured not to be substantially performed. However, by purposely configuring to allow the swinging of the pin main body of the reverse-tapered pin shape as described above, the pin main body tilts in a direction away from the horizontal side surface of the overhanging rib to enable the friction between the largest-diameter tip portion of the pin main body and the horizontal side surface of the overhanging rib to be significantly reduced, even if a situation in which the largest-diameter tip portion of the pin main body rides on and slidingly contacts with the horizontal side surface of the overhanging rib in side view occurs.

DETAILED DESCRIPTION OF THE INVENTION

Figure 1:
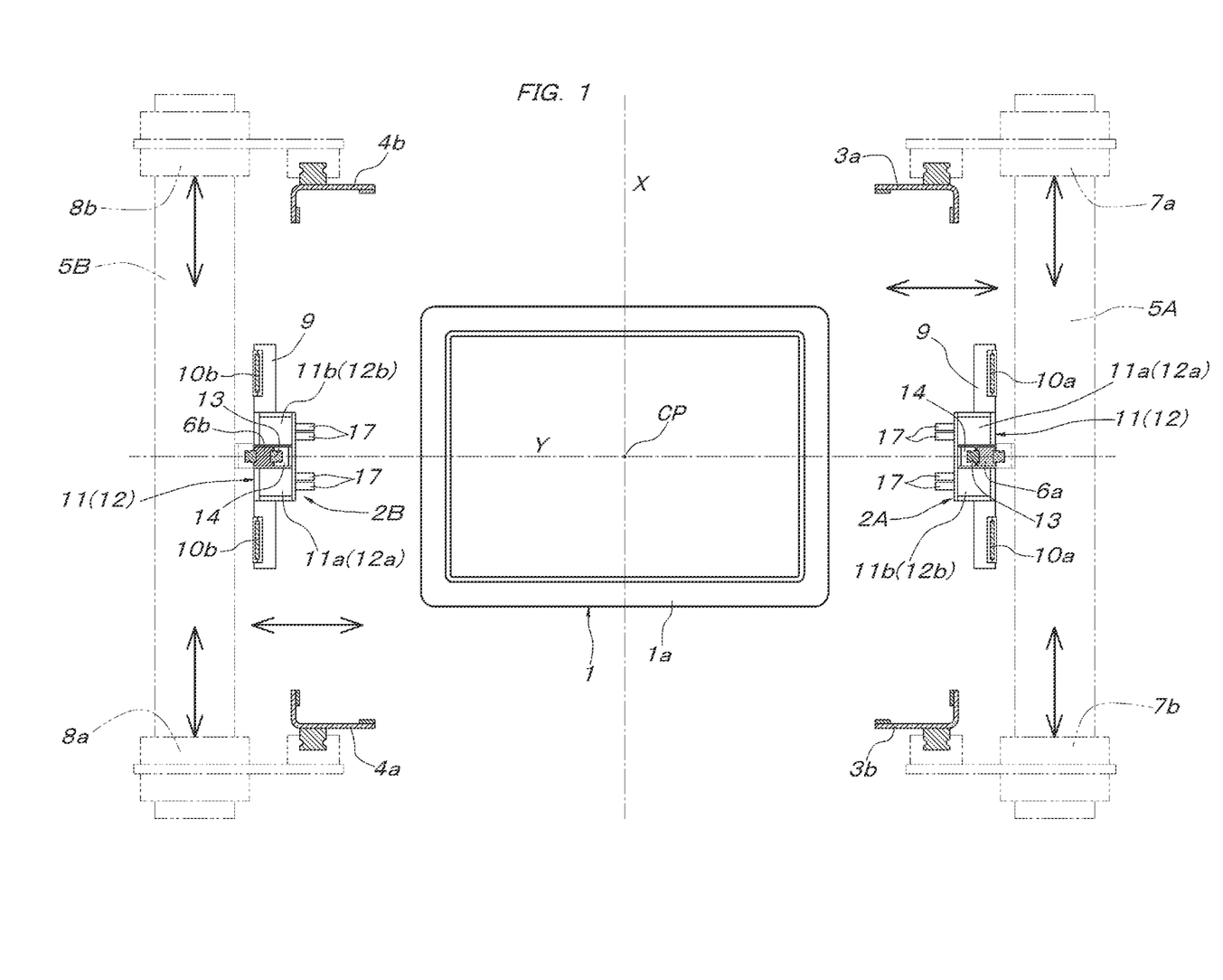
FIG. 1 is a plan view showing a gripping device in an open state with respect to a container to be conveyed.
Figure 2:
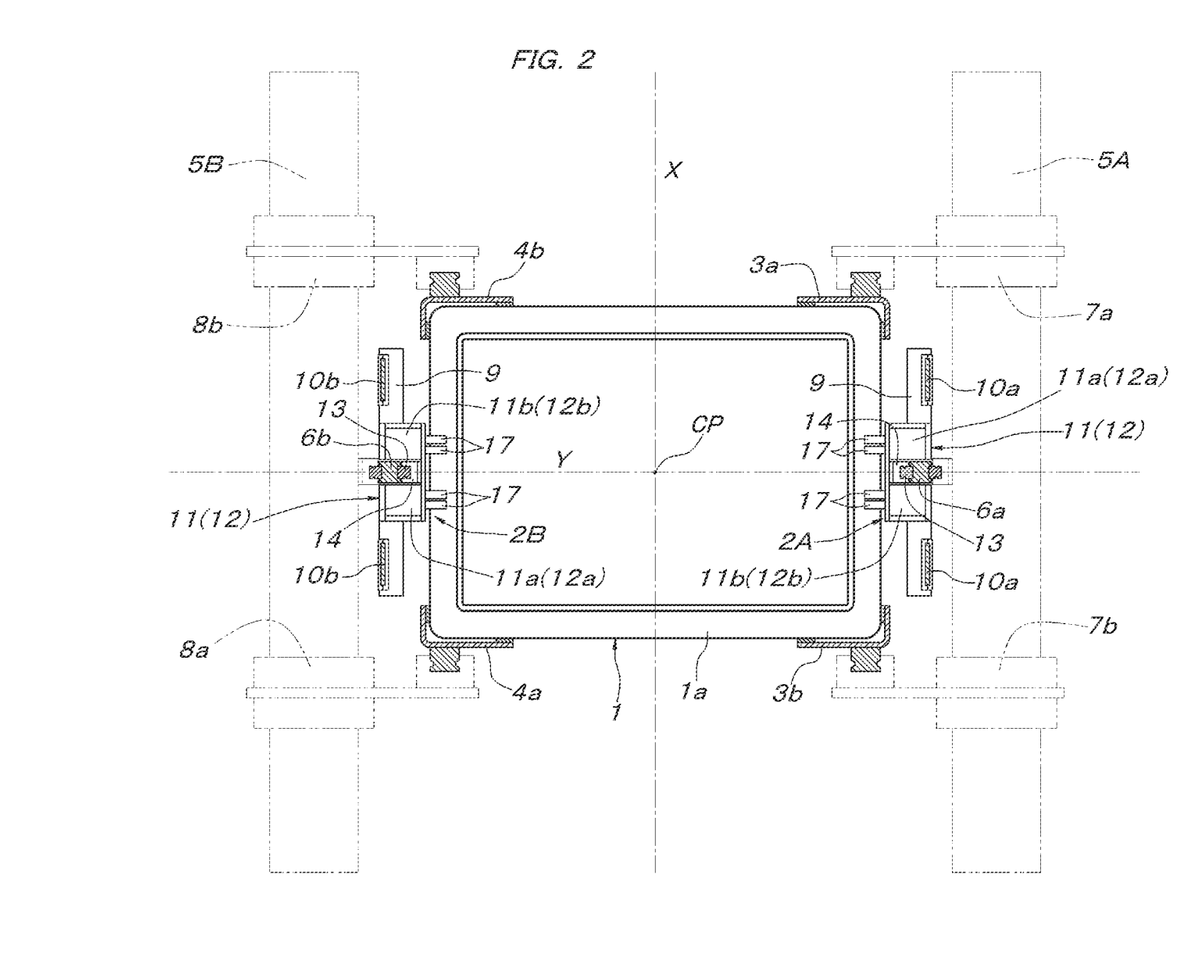
FIG. 2 is a plan view showing the gripping device in a closed state with respect to the container to be conveyed.
Figure 3:
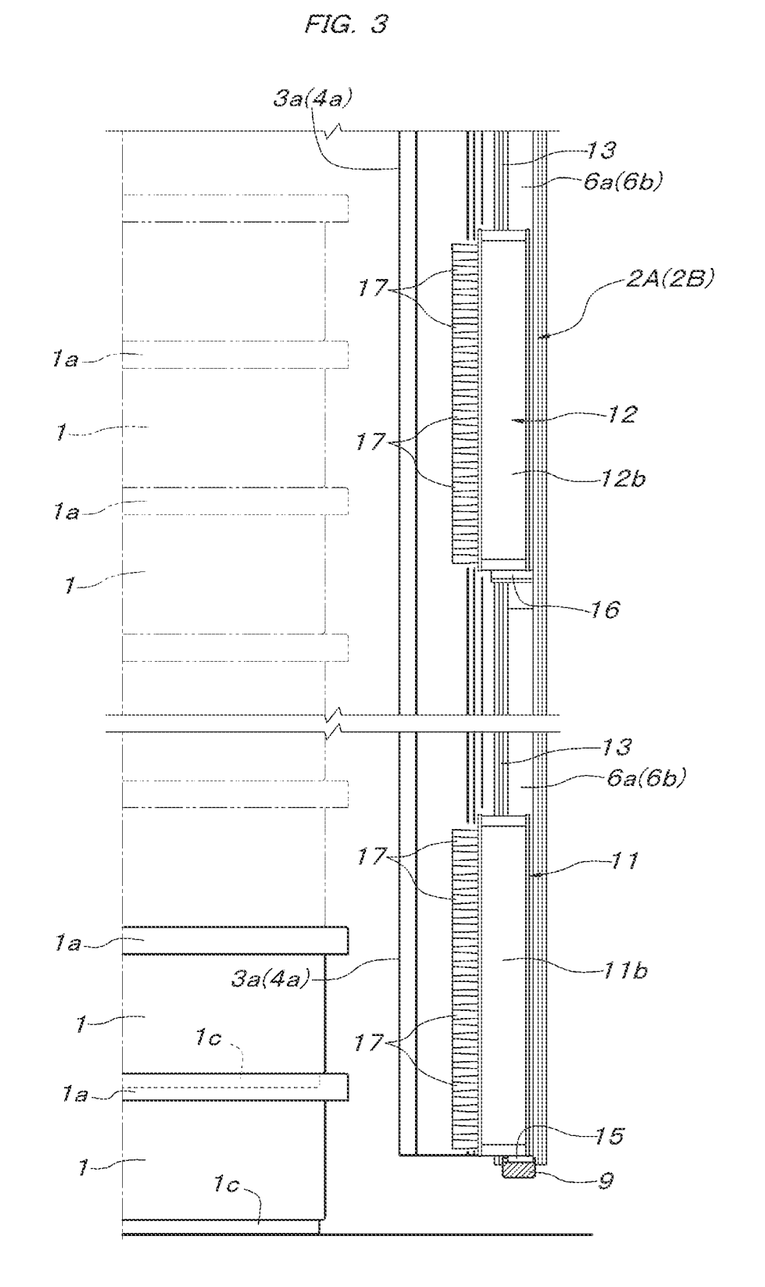
FIG. 3 is a side view showing a main part of the gripping device including upper and lower two-stage container support means.

A raising/lowering conveyance device for a container for conveying an article according to the present embodiment shown in the accompanying drawings has the same basic structure as that described in the description and drawings of a prior invention (Japanese Published Unexamined Patent Application No. 2016-3069) filed by the applicant of the present application previously and patented, and, as shown in FIG. 1 to FIG. 3, lifts and conveys an article conveying container (hereinafter, referred to as a container in short) 1 small enough to be able to be lifted and carried with both hands, made of plastic, and stackable. The raising/lowering conveyance device includes a pair of container support devices 2A, 2B supporting both sides parallel to a horizontal longitudinal direction imaginary line X of the container 1 placed at a center position CP in plan view of the raising/lowering conveyance device of the horizontal longitudinal direction imaginary line X and a horizontal lateral direction imaginary line Y passing through the center position CP and being orthogonal to each other, and four positioning members 3a to 4b fitted to four corners of the container 1 for positioning. Hereinafter, a description will be given by referring to a direction parallel to the horizontal longitudinal direction imaginary line X as a horizontal longitudinal direction and a direction parallel to the horizontal lateral direction imaginary line Y as a horizontal lateral direction.

Laterally moving bases 5A, 5B formed of horizontal members long in the horizontal longitudinal direction, and movable closer to and away from each other in the horizontal lateral direction while keeping symmetrical positions with respect to the horizontal longitudinal direction imaginary line X are provided above the horizontal lateral direction pair of container support devices 2A, 2B. Columnar support members 6a, 6b are vertically movably attached to middle inner sides crossing the horizontal lateral direction imaginary line Y of the laterally moving bases 5A, 5B. The container support devices 2A, 2B are respectively attached inside the columnar support members 6a, 6b at the same height. Further, movable bases 7a to 8b are supported at both end portions in the length direction of each laterally moving bases 5A, 5B so as to be movable closer to and away from each other in the horizontal longitudinal direction while keeping symmetrical positions with respect to the horizontal lateral direction imaginary line Y. The positioning members 3a to 4b are vertically movably supported by the movable bases 7a to 8b, respectively. The positioning members 3a to 4b are each formed of a vertically long shape member having an L shaped cross section in an orientation capable of being fitted to the corresponding four corners of the container 1.

According to the foregoing configuration, both laterally moving bases 5A, 5B are moved closer to each other in the horizontal lateral direction, and at the same time, the movable bases 7a to 8b are moved closer to each other in the horizontal longitudinal direction with respect to the laterally moving base 5A, 5B, whereby central portions of both sides in the horizontal lateral direction of the container 1 can be supported by the horizontal lateral direction pair of container support devices 2A, 2B, and at the same time, the respective positioning members 3a to 4b can be fitted to the four corners of the container 1 as shown in FIG. 2. Both the laterally moving bases 5A, 5B are supported at a fixed height above the floor surface of a container storage area and on a conveyance carriage capable of traveling in the horizontal longitudinal direction and the horizontal lateral direction. The columnar support members 6a, 6b to which respective container support devices 2A, 2B are attached are vertically moved and driven with respect to the respective laterally moving bases 5A, 5B via two each raising/lowering driving flat belts 10a, 10b having lower ends coupled to both end portions of horizontal members 9 attached to lower ends of the columnar support members 6a, 6b so as to project to both sides in the horizontal longitudinal direction of the columnar support members 6a, 6b. The positioning members 3a, 3b and 4a, 4b supported by the same laterally moving bases 5A, 5B as respective container support devices 2A, 2B via the movable bases 7a to 8b move up and down with respect to the respective movable bases 7a, 7b and 8a, 8b in conjunction with the up and down movement of the columnar support members 6a, 6b located at intermediate positions of the positioning members 3a, 3b and 4a, 4b.

The horizontal lateral direction pair of container support devices 2A, 2B include lower container support means 11 attached to lower ends of the columnar support members 6a, 6b and upper container support means 12 attached to the columnar support members 6a, 6b at positions upwardly away from the lower container support means 11 by an appropriate distance. Each of the container support means 11, 12 has the same structure, and as shown in FIG. 5A to FIG. 6B, includes vertically long parallel casings 11a to 12b arranged at both sides in the front-rear direction of the columnar support member 6a, 6b. Between the parallel casings 11a, 11b and 12a, 12b, a pair of upper and lower guide blocks 14 vertically movably fitted to a raising/lowering guide rail 13 attached along the inside of the columnar support member 6a, 6b are attached. As a result, the lower container support means 11 and the upper container support means 12 can move up and down with respect to the columnar support member 6a, 6b. The lower container support means 11 is supported, via a receiving seat 15, on the horizontal member 9 attached to the lower end of the columnar support member 6a, 6b, and the upper container support means 12 is supported at a predetermined height by a receiving seat 16 attached at an intermediate height of the columnar support member 6a, 6b.

Figure 5A:
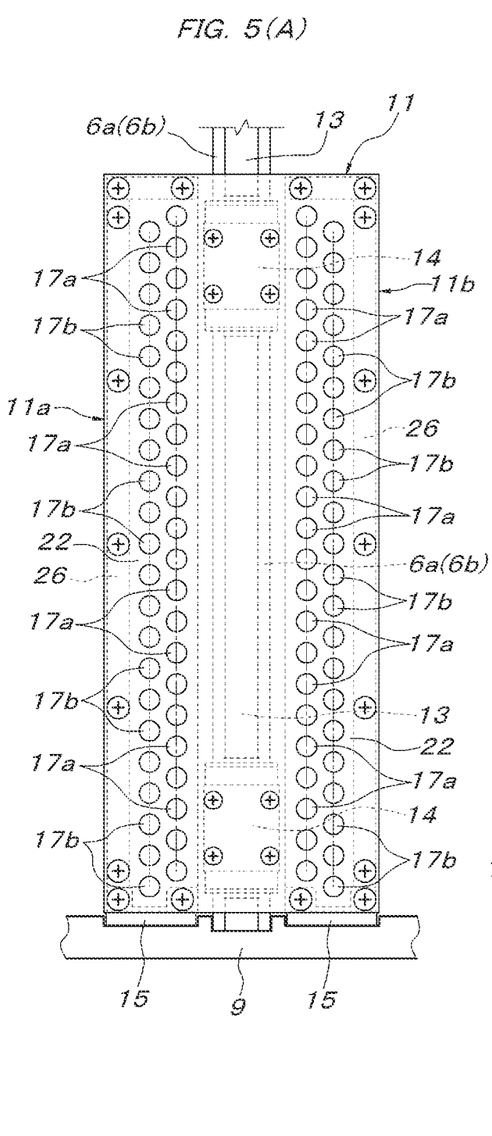
FIG. 5A is a front view showing the container support means and FIG. 5B is a side view of the same.
Figure 5B:
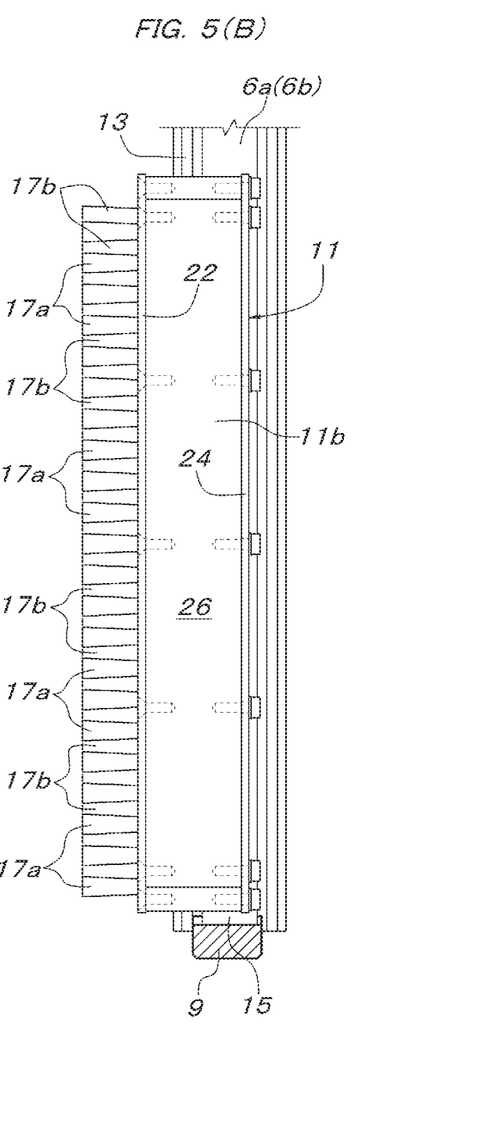
Figure 6A:
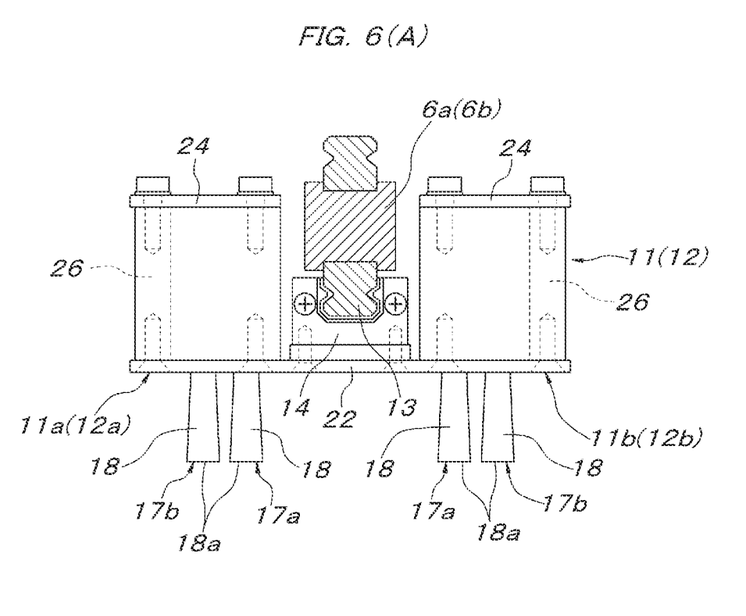
FIG. 6A is a plan view of the container support means and FIG. 6B is a cross sectional plan view of the same container support means.
Figure 6B:
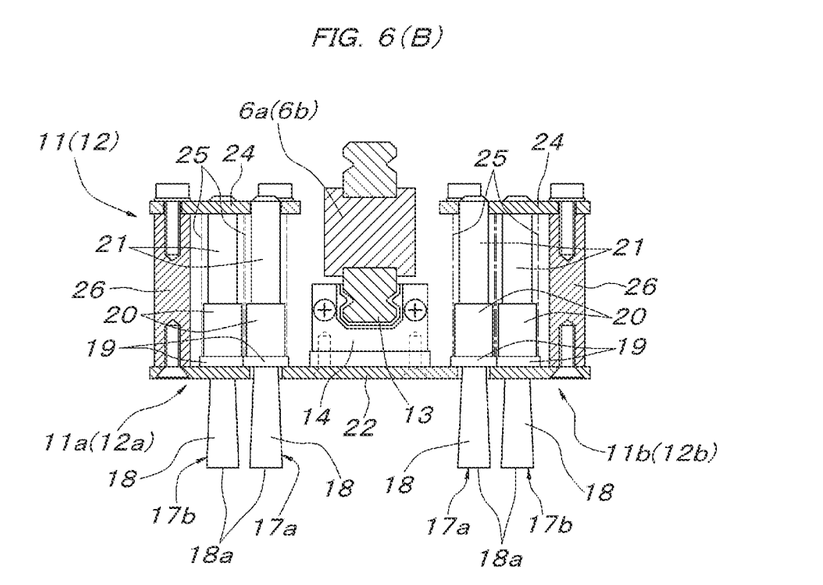
Figure 7A:
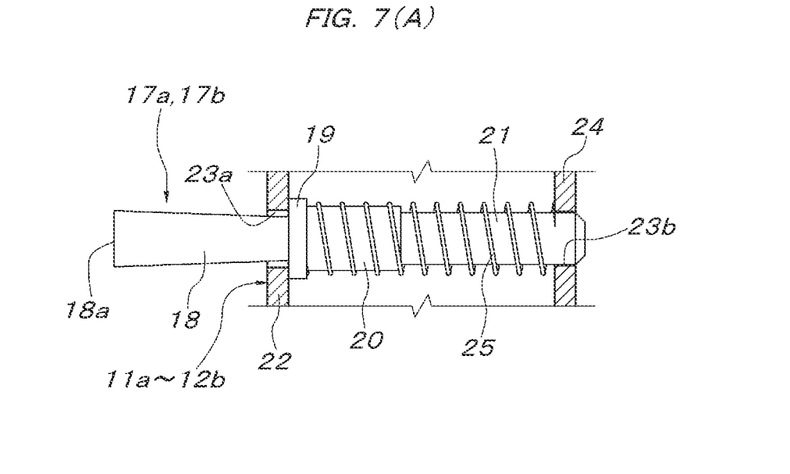
FIG. 7A is a longitudinal sectional side view showing a non-acting state of one container support pin of the container support means and FIG. 7B is a longitudinal sectional side view showing a state in which the same container support pin receives an external force to be retracted.
Figure 7B:
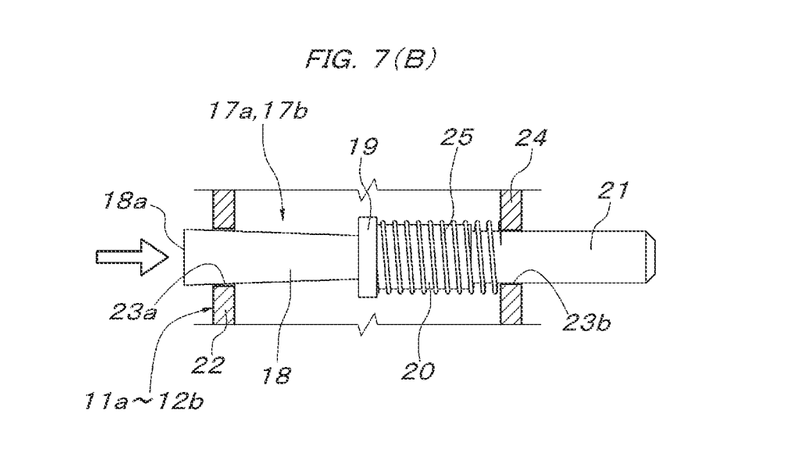

As shown in FIG. 5A and FIG. 5B, in each of the casings 11a to 12b, container support pins 17a, 17b are supported in two columns each at front-rear symmetrical positions with respect to the horizontal lateral direction imaginary line Y in plan view shown in FIG. 1. Thus, in plan view, a horizontal distance between two container support pins 17a at the same height in the inner columns is narrow and a horizontal distance between two container support pins 17b at the same height in the outer columns is wide. The container support pins 17a in the inner column and the container support pins 17b in the outer column all have the same vertical distance there between and are arranged in a staggered manner such that the container support pin 17b in the outer column is located at the center height between two vertically adjacent container support pins 17a in the inner column.

As shown in FIG. 6B to 7B, all of the container support pins 17a, 17b are each composed of a pin main body 18, a flange portion 19 continuously provided to the rear side of the pin main body 18 so as to be concentric, a thick shaft portion 20 continuously provided rearward from the flange portion 19 so as to be concentric, and a thin shaft portion 21 continuously provided rearward from the thick shaft portion 20 so as to be concentric. The pin main body 18 has such a reverse-tapered pin shape that the base portion adjacent to the flange portion 19 has the smallest diameter and the tip has the largest diameter. The largest-diameter tip forms a tip flat surface 18a in an orientation perpendicular to the axial center of the container support pin 17a, 17b. The pin main body 18 passes through a front through hole 23a provided to a plate-shaped front surface member 22 common to the respective casings 11a, 11b and 12a, 12b, and the thin shaft portion 21 passes through a rear through hole 23b provided to a plate-shaped rear surface member 24 of each casing 11a to 12b so as to be concentric with the front through hole 23a, so that the container support pin 17a, 17b is respectively supported by the front surface member 22 and the rear surface member 24 so as to be horizontally advanceable and retractable. The front through hole 23a has a diameter slightly larger than the largest diameter of the tip of the pin main body 18 of the reverse-tapered pin shape. A compression coil spring 25 is loosely fitted to the thick shaft portion 20 and the thin shaft portion 21 between the flange portion 19 and the rear surface member 24, and the container support pin 17a, 17b is biased in an orientation in which the flange portion 19 is pressure-contacted with the back surface of the front surface member 22 by the biasing force of the compression coil spring 25. Reference sign 26 denotes plate-shaped side surface members coupling both left and right outer sides of the front surface member 22 and outer sides of the respective rear surface members 24.

As shown in FIG. 1 to FIG. 4, the container 1 handled by the raising/lowering conveyance device configured as described above has a box shape whose planar shape is quadrangular and whose upper side is opened. An overhanging rib 1a projecting outward for reinforcement and handle formation and having an inverted L shaped cross section is integrally molded around an opening portion. A protruding base portion 1c having a size capable of fitting inside the opening portion is integrally molded at a bottom portion. In this configuration, a vertical wall portion 28a of the overhanging rib 1a having the inverted L shaped cross section has a lower end surface forming a downward step surface supported by the container support pins 17a, 17b. As a matter of course, the container 1 is not limited to the shown structure. For example, regarding the overhanging rib structure, a container having an overhanging rib structure of an upper and lower two-stage structure including an upper overhanging rib 1b projecting in a horizontal plate shape and a lower overhanging rib 1a having an inverted L shaped cross section may be provided as shown by imaginary lines in FIG. 8A and FIG. 8B and shown in FIG. 9A to FIG. 10B. The downward step surface supported by the container support pins 17a, 17b in this case is both a lower end surface of a vertical wall portion 28a of the lower overhanging rib 1a having the inverted L shaped cross section and a lower surface of the horizontal plate-shaped upper overhanging rib 1b.

Within the storage area of the container 1 provided with the raising/lowering conveyance device having the foregoing configuration, the container 1 is placed in an orientation in which four sides thereof are parallel to the horizontal longitudinal direction and the horizontal lateral direction. When a specific container 1 among the containers 1 is conveyed from that position to another place, as shown in FIG. 1, the raising/lowering conveyance device is made to travel so that the center position CP of the raising/lowering conveyance device and the center position of the container 1 to be conveyed coincide with each other in plan view, and is stopped at a position directly above the container 1 to be conveyed. Next, the raising/lowering driving flat belts 10a, 10b are driven with the container support devices 2A, 2B and the respective positioning members 3a to 4b located outside the container 1 to be conveyed in plan view, the horizontal lateral direction pair of columnar support members 6a, 6b and the four positioning members 3a to 4b are lowered, and as shown in FIG. 3, the lower container support means 11 of the container support devices 2A, 2B and the respective positioning members 3a to 4b are positioned directly beside the overhanging rib 1a of the container 1 to be conveyed (directly beside the overhanging rib 1a of the lowermost container 1 when a plurality of upper and lower containers 1 stacked are to be conveyed as shown in FIG. 3). At this time, there is a case where the container 1 to be conveyed is a large number of containers stacked and a container or containers 1 to be conveyed are located also inside the upper container support means 12 of the container support devices 2A, 2B.

Figure 4:
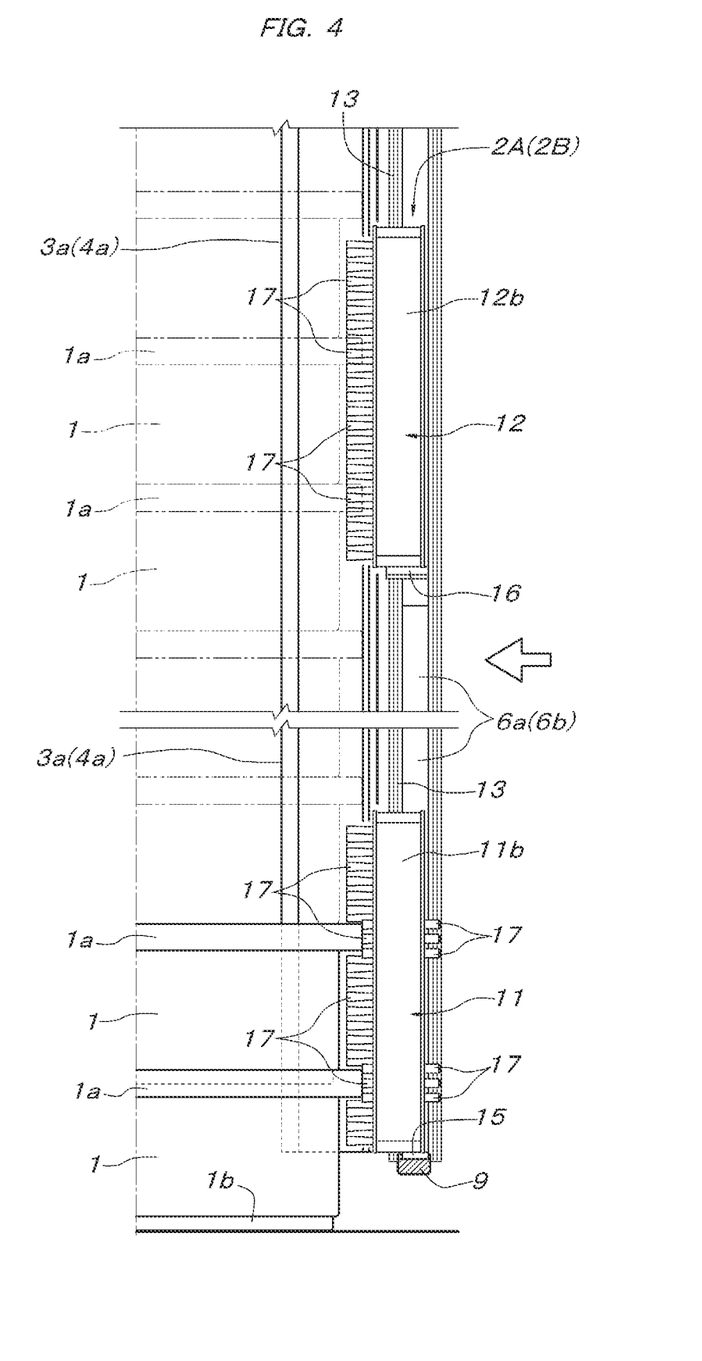
FIG. 4 is a side view showing a state in which the lower container support means of the gripping device shown in FIG. 3 supports the container.

Once the container support devices 2A, 2B and the respective positioning members 3a to 4b are lowered to a predetermined height as described above, the laterally moving bases 5A, 5B are then moved closer to each other in the horizontal lateral direction and the movable bases 7a to 8b on each laterally moving base 5A, 5B are moved closer to each other in the horizontal longitudinal direction, and as shown in FIG. 2 and FIG. 4, the respective positioning members 3a to 4b are fitted to the four corners of the container 1 to be conveyed and at the same time, the container 1 to be conveyed is sandwiched from both sides in the horizontal lateral direction by both the container support devices 2A, 2B. As a result, as shown in FIG. 4, of the container support pins 17a, 17b of the upper and lower container support means 11, 12 in both the container support devices 2A, 2B, the container support pins 17a, 17b at a height where the tip flat surfaces 18a of the pin main bodies 18 even partially overlap the height range of the vertical wall portion 28a of the overhanging rib 1a of the container 1 to be conveyed have their tip flat surfaces 18a abut against the vertical wall portion 28a of the overhanging rib 1a and are inhibited from advancing movement. Thus, the container support pins 17a, 17b relatively retract into the casing 11a to 12*b* against the biasing force of the compression coil springs 25. Only the other container support pins 17*a*, 17*b* are moved closer to predetermined positions outside the container 1 to be conveyed while being held at protruding positions by the biasing force of the compression coil springs 25.

Once the container 1 to be conveyed is sandwiched from both sides in the horizontal lateral direction by both the container support devices 2A, 2B which is moved closer to each other in the horizontal lateral direction in the foregoing manner as shown in FIG. 2 and FIG. 4, the raising/lowering driving flat belts 10*a*, 10*b* are driven in the reverse direction to raise the horizontal lateral direction pair of columnar support members 6*a*, 6*b* and the four positioning members 3*a* to 4*b*. As a result, of the container support pins 17*a*, 17*b* of both the container support devices 2A, 2B, the pin main bodies 18 of two container support pins 17*a* or 17*b* at the same height which entered directly below the vertical wall portion 28*a* of the overhanging rib 1*a* of the container 1 to be conveyed lift the container 1 to be conveyed. Once the container 1 to be conveyed is lifted to a predetermined height, the conveyance carriage including both the laterally moving bases 5A, 5B is made to travel in the horizontal longitudinal direction and the horizontal lateral direction, and then the lifted container 1 is conveyed to a position directly above a container unloading position within the container storage area. Once the container 1 is conveyed to the position directly above the target container unloading position, the raising/lowering conveyance device is only required to be operated in a procedure reverse to the foregoing container lifting procedure.

Figure 8A:
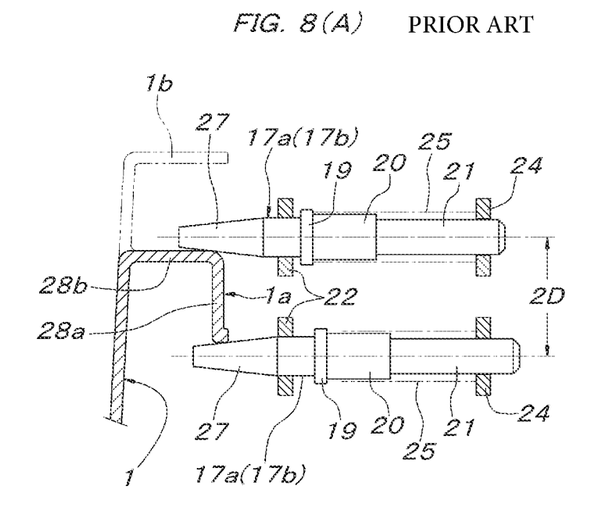
FIG. 8A is a longitudinal sectional side view showing a state in which conventional container support pins sandwich an overhanging rib from above and below and FIG. 8B is a longitudinal sectional side view showing a state in which the container support pins of the present invention act upon an overhanging rib under the same conditions as FIG. 8A.
Figure 9A:
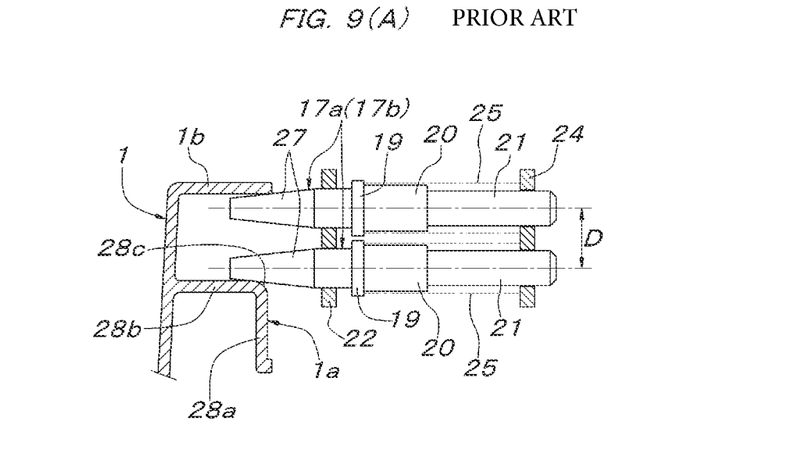
FIG. 9A is a longitudinal sectional side view showing a state in which the conventional container support pins are press-fitted between upper and lower overhanging ribs and FIG. 9B is a longitudinal sectional side view showing a state in which the container support pins of the present invention act upon upper and lower overhanging ribs under the same conditions as FIG. 9A.
Figure 10A:
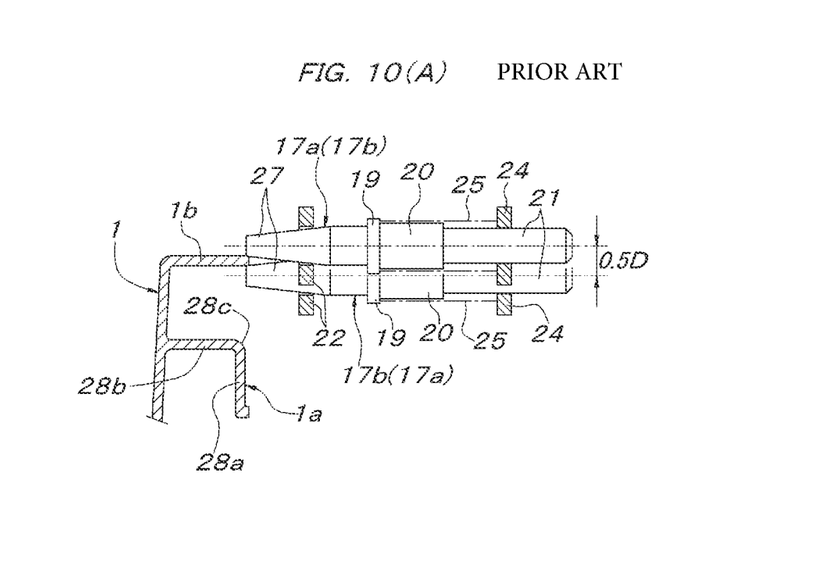
FIG. 10A is a longitudinal sectional side view showing a state in which the conventional container support pins sandwich an inverted L shaped overhanging rib from above and below and FIG. 10B is a longitudinal sectional side view showing a state in which the container support pins of the present invention act upon an inverted L shaped overhanging rib under the same conditions as FIG. 10A.

The container 1 can be lifted and conveyed by the container support devices 2A, 2B as described above. Hereinafter, differences in operation between a case in which the pin main body of the container support pin 17*a*, 17*b* is a pin main body 27 of the conventional tapered pin shape as shown in FIG. 8A, FIG. 9A, and FIG. 10A and a case in which the pin main body is the pin main body 18 of the reverse-tapered pin shape of the present invention having been described in the foregoing embodiment will be described. As a matter of course, in either case, the vertical distance D in side view between the container support pins 17*a*, 17*b* in each column is the same, and the vertical positions of the container support pins 17*a*, 17*b* are shifted by a distance of 0.5D between the adjacent columns.

Figure 8B:
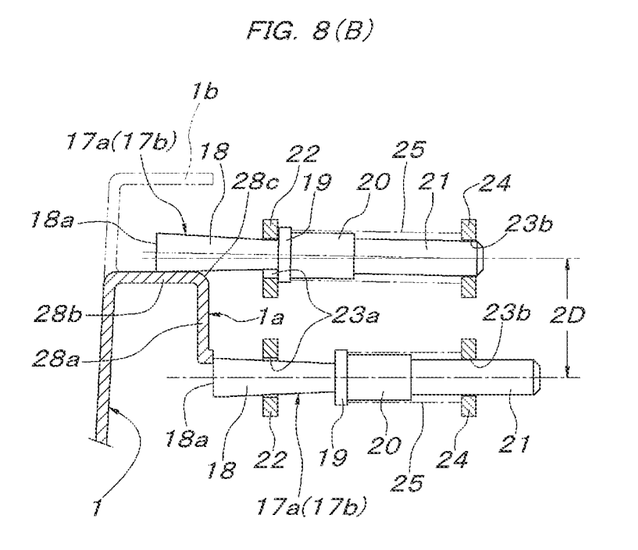

As shown in FIG. 8A and FIG. 8B, when the vertical height of the vertical wall portion 28*a* of the overhanging rib 1*a* having the inverted L shaped cross section on the container 1 side is larger than the vertical distance D in side view between the container support pins 17*a*, 17*b* in the same column but smaller than the twice (2D), there is a possibility that two container support pins 17*a* or 17*b* separated by the vertical distance 2D in side view sandwich the overhanging rib 1*a* having the inverted L shaped cross section from above and below. That is, in a case of the pin main bodies 27 of the conventional tapered pin shape, the vertical distance between circumferential surfaces of the smallest-diameter tips is wider than the height of the vertical wall portion 28*a* of the overhanging rib 1*a*, and the upper pin main body 27 rides on the upper side of a horizontal plate portion 28*b* of the overhanging rib 1*a* and the lower pin main body 27 enters below the vertical wall portion 28*a* of the overhanging rib 1*a* as shown in FIG. 8A. The circumferential surfaces of both pin main bodies 27 pressure-contact with both upper and lower surfaces of the overhanging rib 1*a* (the upper surface of the horizontal plate portion 28*b* and the lower end surface of the vertical wall portion 28*a*) to increase the frictional resistance between the both, so that the pin main bodies 27 stop against the biasing force of the compression coil springs 25 before the parallel casings 11*a* to 12*b* reach the advance limit position. In this state, the frictional resistance between both the upper and lower pin main bodies 27 and the overhanging rib 1*a* is very large.

On the other hand, in a case of the pin main bodies 18 of the reverse-tapered pin shape of the present invention, as shown in FIG. 8B, even if the vertical positions of the two container support pins 17*a*, 17*b* separated by the vertical distance 2D with respect to the overhanging rib 1*a* are the same, one of both upper and lower pin main bodies 18, for example, the lower pin main body 18, has its largest-diameter tip flat surface 18 abut against the front surface of the vertical wall portion 28*a* of the overhanging rib 1*a* and stops at that position and the upper pin main body 18 has its largest-diameter tip flat surface 18*a* guided by a chamfered corner 28*c* between the vertical wall portion 28*a* and the horizontal plate portion 28*b* of the overhanging rib 1*a* and moves to the upper surface of the horizontal plate portion 28*b* of the overhanging rib 1*a* while slightly swinging upward. The swinging of the pin main body 18 at this time is performed reasonably and easily within a range of a wide annular space between the front through hole 23*a* of the front surface member 22 supporting the pin main body 18 and the smallest-diameter base portion of the pin main body 18 located within the front through hole 23*a*. As a result, the upper pin main body 18 continues the advancing movement with one place of a peripheral edge of its largest-diameter tip flat surface 18*a* slidingly contacting with the upper surface of the horizontal plate portion 28*b* of the overhanging rib 1*a*. The frictional resistance at this time is very small as compared with a case in which the circumferential surfaces of the pin main bodies 27 of the conventional tapered pin shape dig into both upper and lower surfaces of the overhanging rib 1*a* like a wedge action. Thus, the upper pin main body 18 moves to the advance limit position integrally with the container support means 11, 12 as shown. Even if there is a pin main body 18 in a state of overlapping the upper surface of the horizontal plate portion 28*b* of the overhanging rib 1*a* as just described, only the upper surface of the horizontal plate portion 28*b* of the overhanging rib 1*a* and the one place of the peripheral edge of the largest-diameter tip flat surface 18*a* are pressure contacted and the frictional force between the both is small.

Figure 9B:
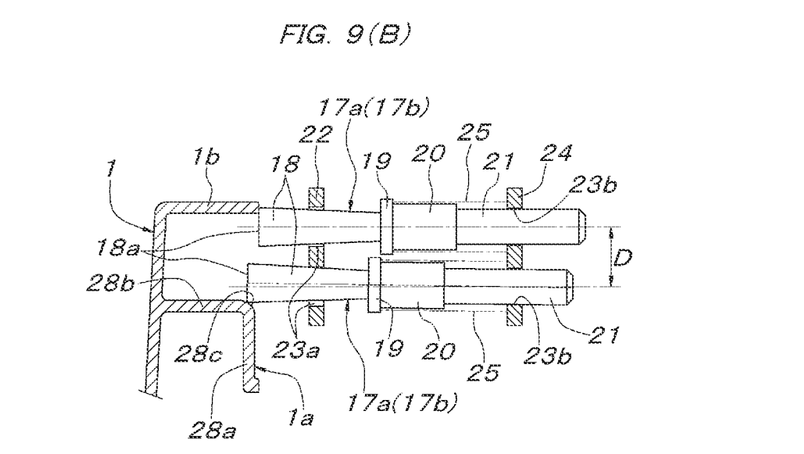

As shown in FIG. 9A and FIG. 9B, in a container 1 in which a horizontal plate-shaped overhanging rib 1*b* (hereinafter, referred to as an upper overhanging rib 1*b*) is provided above an overhanging rib 1*a* having an inverted L shaped cross section (hereinafter, referred to as a lower overhanging rib 1*a*) at a distance slightly wider than the distance D between two container support pins 17*a* or 17*b* vertically adjacent in side view, as shown in FIG. 9A, the pin main bodies 27 of the conventional tapered pin shape in the two container support pins 17*a*, 17*b* vertically adjacent with the distance D in side view have their small-diameter tip portions enter between both upper and lower overhanging ribs 1*a*, 1 *b*, and the frictional force between the respective pin main bodies 27 and both the upper and lower surfaces of the overhanging ribs 1*a*, 1*b* is increased in association with the advancing movement of the container support pins 17*a*, 17*b*. At the point in time at which the frictional force overcomes the biasing force of the compression coil spring 25 acting on each pin main body 27, the container support pins 17*a*, 17*b* stop, and only the parallel casings 11*a* to 12*b* advance to the advance limit position against the biasing force of the compression coil springs 25. In this state, both the upper and lower pin main bodies 27 are in a state of being press-fitted between the overhanging ribs 1*a*, 1*b* like a wedge action, and the frictional resistance between both the upper and lower pin main bodies 27 and the overhanging ribs 1*a*, 1*b* is very large.

On the other hand, in a case of the pin main bodies 18 of the reverse-tapered pin shape of the present invention, in the same manner as the situation described based on FIG. 8B, as shown in FIG. 9B, a part of the periphery of the largest-diameter tip flat surface 18*a* of both upper and lower pin main bodies 18 abuts against the vertical front surface of the overhanging rib 1*a*, 1*b* and stops at that position, or one of both upper and lower pin main bodies 18, for example, the upper pin main body 18, has its largest-diameter tip flat surface 18*a* abut against a vertical end surface of the tip of the overhanging rib 1*b* and stops. However, the lower pin main body 18 has its largest-diameter tip flat surface 18*a* whose one place of the peripheral edge is guided by the chamfered corner 28*c* between the vertical wall portion 28*a* and the horizontal plate portion 28*b* of the overhanging rib 1*a* and moves toward the upper surface of the horizontal plate portion 28*b* of the overhanging rib 1*a* while slightly swinging upward. The lower pin main body 18 stops at the point in time at which the upward swinging is restricted by the abutment between the front through hole 23*a* and the pin main body 18. As a matter of course, when the positions of the two container support pins 17*a* or 17*b* at this time are a little higher, the lower pin main body 18 has its largest-diameter tip flat surface 18*a* whose one place of the peripheral edge slides on the upper surface of the horizontal plate portion 28*b* of the rib 1*a*, and moves to the advance limit position integrally with the container support means 11, 12, similar to FIG. 8B. In any case, even if there are pin main bodies 18 in a state of overlapping both the upper and lower surfaces of the overhanging ribs 1*a*, 1*b*, only both the upper and lower surfaces of the overhanging ribs 1*a*, 1*b* and the one place of each of the peripheral edges of the largest-diameter tip flat surfaces 18*a* of the pin main bodies 18 are pressure contacted and the frictional force between the both is small.

Further, as shown in FIG. 10A, such a phenomenon occurs in the pin main bodies 27 of the conventional tapered pin shape that the circumferential surfaces of the smallest-diameter tip portions of the pin main bodies 27 of two container support pins 17*a*, 17*b* located in two adjacent columns and vertically adjacent at a distance of 0.5D in side view sandwich an end edge of the horizontal plate-shaped overhanging rib 1*b*, when the plate thickness of the horizontal plate-shaped overhanging rib 1*b* is thin. Also when such a phenomenon occurs, each pin main body 27 stops at a position in which the frictional resistance force between each pin main body 27 and the overhanging rib 1*b* becomes larger than the biasing force of the compression coil spring 25, and after that, the parallel casings 11*a* to 12*b* advance to the advance limit position against the biasing force of the compression coil springs 25 with respect to the container support pins 17*a*, 17*b*. As a result, the end edge of the overhanging rib 1*b* digs into the circumferential surfaces of the smallest-diameter tip portions of the pin main bodies 27 of the two container support pins 17*a*, 17*b*, and a considerable frictional force is generated between the both.

On the other hand, in the configuration of the present invention, two pin main bodies 18 of the reverse-tapered pin shape which are vertically adjacent in side view and belong to different columns are configured such that the largest-diameter tips vertically partially overlap each other in side view. Thus, as shown in FIG. 10B, there is no possibility that the end edge of the overhanging rib 1*b* enters between the pin main bodies 18 of the two container support pins 17*a*, 17*b* vertically adjacent at a distance of 0.5D.

Figure 10B:
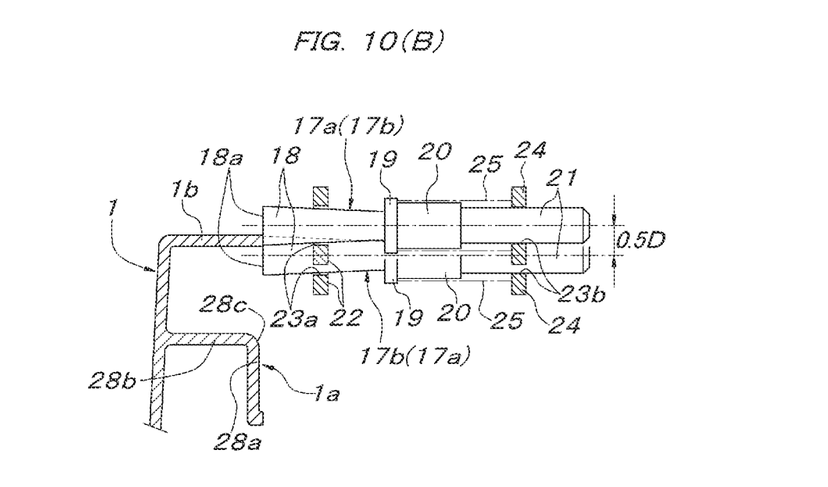

As obvious from the foregoing description based on FIG. 8B, FIG. 9B, and FIG. 10B, according to the configuration of the container support pins 17*a*, 17*b* including the pin main bodies 18 of the reverse-tapered pin shape of the present invention, such a possibility is eliminated that when the container support pins 17*a*, 17*b* advance to the container 1 side, the circumferential surfaces of the pin main bodies pressure-contact with the upper and lower surfaces of the overhanging rib of the container 1 side in such a manner as to dig into the upper and lower surfaces and the frictional force generated between the both becomes enormous as in the case of using the container support pins including the pin main bodies 27 of the conventional tapered pin shape. Thus, when the container support pins 17*a*, 17*b* are horizontally withdrawn from the overhanging rib of the container 1 after the container is conveyed, a possibility is also eliminated that such a disadvantage that the container support pins 17*a*, 17*b* drag the container 1 and the position and/or the orientation of the container 1 may change occurs.

When the present invention is carried out, the upper container support means 12 can be omitted if containers 1 stacked can be lifted and conveyed without problems only by the lower container support means 11 forming the container support devices 2A, 2B depending on the number, weight, etc., of stacked containers 1 to be conveyed. Further, by configuring the arrangement of the container support pins 17*a*, 17*b* in the container support means 11, 12 forming the container support devices 2A, 2B into the arrangement of the shown embodiment, although varying in width of distance, two places bilaterally symmetrical to the vertical center line passing through the center in the width direction of both parallel side portions of the container 1 can always be supported by the container support pins 17*a*, 17*b* at the same height. Furthermore, the vertical distance capable of supporting the container can be narrowed to a distance of 0.5D, which is half of the vertical distance D in each column between the container support pins 17*a*, 17*b*.

A raising/lowering conveyance device for a container for conveying an article of the present invention can be utilized as a device capable of, in a storage facility of a type in which an article conveying container small enough to be able to be lifted with both hands is directly placed on a flat surface, tightly holding both sides of the container by container support means having a pinholder shaped structure and lifting and conveying the container.

What is claimed is:

1. A raising/lowering conveyance device for a container for conveying an article, comprising:
   at least two sets of container support means horizontally movable closer to and away from the container and movable up and down with respect to the container, the container support means having a pin holder shaped structure having a large number of container support pins being capable of horizontally protruding and retracting on a side where the container is located and being biased and held at positions protruding from front surface members of the container support means;
   the container support means being configured such that the container support pins are operable to enter below a downward step surface of an overhanging rib formed outside the container by approaching movement with respect to the container such that the container can be lifted;

the container support means includes front through holes and the container support pins each include a pin main body passing through an associated one of the front through holes of the container support means and protruding from the container support means, and the pin main bodies each include a flat tip surface perpendicular to an axial center and are formed in a reverse-tapered pin shape whose diameter is increased toward the flat tip surface; and the front through holes through which the pin main bodies pass have a diameter allowing a largest-diameter tip portion of the pin main body of a reverse-tapered pin shape to penetrate, and the container support pins are configured to be swingable within a range of annular spaces between the front through holes and the pin main bodies.

2. The raising/lowering conveyance device for the container for conveying an article according to claim 1, wherein the pin main bodies of the container support pins are arranged such that tips of the pin main bodies vertically adjacent in side view partially overlap each other.

3. The raising/lowering conveyance device for the container for conveying an article according to claim 1, wherein the container support pins are each composed of the pin main body, a flange portion continuously provided to a rear end of the pin main body so as to be concentric, and a shaft portion continuously provided rearward from the flange portion so as to be concentric, and for the container support means, the front surface members includes the front through holes through which the pin main bodies pass, and rear surface members are provided with rear through holes through which the shaft portions pass, and compression coil springs for biasing the container support pins in a protruding direction to pressure-contact the flange portions with back surfaces of the front surface members are fitted to the shaft portions between the flange portions and the rear surface members.

4. A raising/lowering conveyance device for a container for conveying an article, comprising:
    at least two sets of container support means horizontally movable closer to and away from an article conveying container and movable up and down with respect to the container, the container support means having a pin holder shaped structure having a large number of container support pins being capable of horizontally protruding and retracting on a side where the container is located and being biased and held at positions protruding from front surface members of the container support means;
    the container support means being configured such that the container support pins are operable to enter below a downward step surface of an overhanging rib formed outside the container by approaching movement with respect to the container such that the container can be lifted;
    pin main bodies protruding from the front surface members of the container support means of the container support pins each include a flat tip surface perpendicular to an axial center and are formed in a reverse-tapered pin shape whose diameter is increased toward the flat tip surface;
    the container support pins are each composed of the pin main body, a flange portion continuously provided to a rear end of the pin main body so as to be concentric, and a shaft portion continuously provided rearward from the flange portion so as to be concentric;
    the front surface members of the container support means are provided with front through holes through which the pin main bodies pass, and rear surface members are provided with rear through holes through which the shaft portions pass;
    compression coil springs for biasing the container support pins in a protruding direction to pressure-contact the flange portions with back surfaces of the front surface members are fitted to the shaft portions between the flange portions and the rear surface members; and
    the front through holes through which the pin main bodies pass have a diameter allowing a largest-diameter tip portion of the pin main body of a reverse-tapered pin shape to penetrate, and the container support pins are configured to be swingable within a range of annular spaces between the front through holes and the pin main bodies.

\* \* \* \* \*